(12) United States Patent
Hamlin, III

(10) Patent No.: US 8,794,290 B2
(45) Date of Patent: Aug. 5, 2014

(54) APPARATUS FOR CREATING AN ENCASED CABLE SEAM

(76) Inventor: Henry L. Hamlin, III, Macon, GA (US)

( * ) Notice: Subject to any disclaimer, the term of this patent is extended or adjusted under 35 U.S.C. 154(b) by 242 days.

(21) Appl. No.: 13/225,300

(22) Filed: Sep. 2, 2011

(65) Prior Publication Data

US 2012/0103528 A1    May 3, 2012

Related U.S. Application Data

(60) Provisional application No. 61/379,589, filed on Sep. 2, 2010.

(51) Int. Cl.
*B29C 65/10* (2006.01)
(52) U.S. Cl.
USPC ........... 156/499; 156/497; 156/574; 156/577; 156/579
(58) Field of Classification Search
USPC ........................ 156/499, 497, 577, 574, 579
See application file for complete search history.

(56) References Cited

U.S. PATENT DOCUMENTS

| | | | | |
|---|---|---|---|---|
| 3,483,664 A * | 12/1969 | Funk et al. | .................... | 52/309.6 |
| 3,922,822 A * | 12/1975 | Mollinger | .......................... | 52/63 |
| 5,439,540 A * | 8/1995 | Lippman et al. | ................. | 156/71 |
| 5,776,299 A * | 7/1998 | Morris | ........................... | 156/497 |
| 6,588,475 B1 * | 7/2003 | Simon et al. | ................... | 156/359 |

* cited by examiner

*Primary Examiner* — Jeff Aftergut
(74) *Attorney, Agent, or Firm* — Brian D. Bellamy

(57) ABSTRACT

An apparatus for creating an encased cable seam includes a transportable support frame with a roll of encased cable material supported by a support bar, boom and spindle. Heating units supported by the frame heat the bottom surface of the membrane portion of the encased cable material. The encased cable material released from the roll toward the substrate to create an overlapping seam of the encased cable material on the membrane substrate of a roof deck. The apparatus includes a handle and a roller, whereby the roller presses the encased cable material causing a welded bond as the handle moves the apparatus forward.

1 Claim, 1 Drawing Sheet

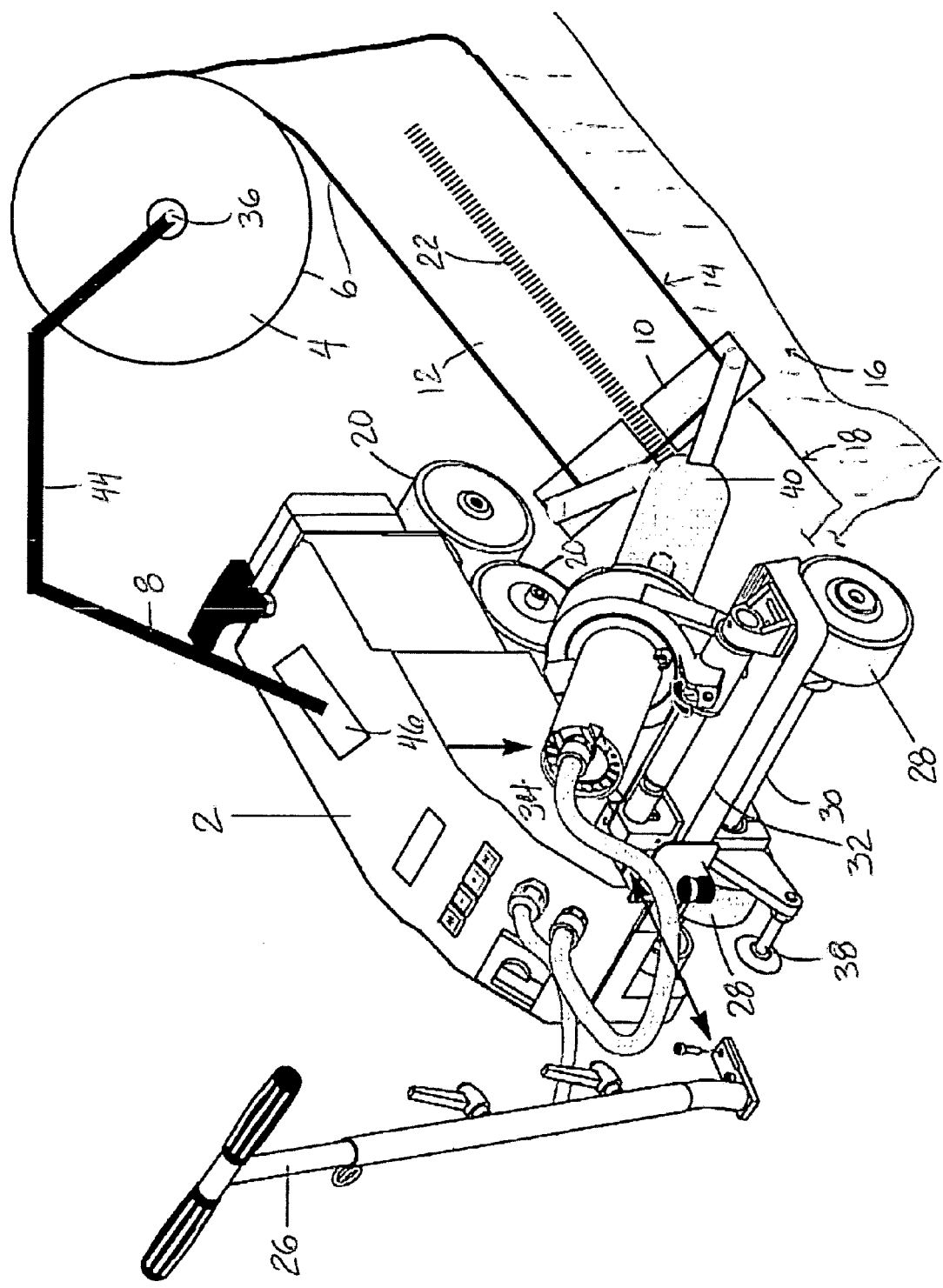

APPARATUS FOR CREATING AN ENCASED CABLE SEAM

PRIORITY CLAIM

The present applications claims benefit of priority of U.S. Provisional Patent Application No. 61/379,589 filed on Sep. 2, 2010.

BACKGROUND OF THE INVENTION

The present invention relates to installation of thermoplastic roofing membranes, and, particularly, to an apparatus to create a cable seam encased in thermoplastic membrane material for installation of roofing membrane.

It is known to apply thermoplastic membranes to roof tops to prevent leakage of water through the roof. Typically, the membranes are sealed to each other along overlapping edges, and the membrane is attached to the roof deck by mechanical means or adhesive. It has been discovered in related applications that using a system of cables for installation of roofing membrane has advantages over prior art glue, asphalt or mechanical screws. In an embodiment of the cable system for installation of the membrane, it is beneficial to cover the cable in welded membrane strips to seal the cable to provide a finished appearance, protect against nature's elements, and prevent roof leaks. The sealed cable may be attached to the roof by mechanical means or welded to underlying membrane via the cable covering membrane to attach the cable to the roof and retain the underlying membrane.

In the manual method for covering the cable with membrane, a strip of membrane material must be cut for laying above the cable. The cable is laid across the roof, and then the strip of membrane is laid on top of the cable across the roof in the desired location. The strip of membrane is then heated to weld the strip to the underlying membrane roofing and encase the cable within the membrane. An advantage of the cable system for installation of roofing membrane is a reduction of time and efficiency. However, the manual process for laying out a cable and welding a strip of membrane to cover the cable is still somewhat time consuming and needs further improvement.

Accordingly, there is a need for automating the process of installing thermoplastic membrane encased cables in a system for securing roofing membrane by cables instead of traditional mechanical or adhesive means.

SUMMARY OF THE INVENTION

The present invention improves the efficiency of cable and membrane strip installation to secure a membrane roofing material. In particular, an apparatus is provided for faster installation of both cable and membrane. The apparatus combines the installation of cable and a strip covering of membrane material for the cable into a single step. Further, the apparatus provided means to align and lay the cable and seam by machine rather than hand. And still further, the apparatus provides a means to align the cable and seam in a correct location on the roof and lay the cable and seam across the roof accurately.

The apparatus provides a machine for heating membrane material for welding the material together. A spool of membrane encased cable material is provided on the machine for laying on the roof to form a seam. The encased cable material may include a strip of membrane roofing material and a cable. The heating element of the machine heats both sides of the encased cable as the seam is laid on the roof to thereby weld the seam to the roof covering membrane and weld the seam to permanently secure the cable therein. The spool rolls the cable in a straight line forward of the heating element as the machine moves, and the machine rolls forward to move the heating element to weld the seam. The machine may be hand operated and laser guided to control movement.

BRIEF DESCRIPTION OF THE DRAWINGS

FIG. 1 is a perspective view of an apparatus for creating an encased cable seam on a roofing membrane in accordance with an embodiment of the invention.

DETAILED DESCRIPTION OF THE INVENTION

FIG. 1 illustrates an apparatus in accordance with an embodiment of the invention. The present invention is embodied in an apparatus for sheet material of the type having a heat sensitive lower surface, such as membrane roofs. Such membrane roof materials most commonly are made from synthetic rubber, thermoplastic (PVC or similar material), or modified bitumen ("torch down" bitumen roofing material or the like).

The apparatus includes a transportable support frame 2. A roll 4 of encased cable material 6 is mounted forward of the support frame 2 by a support bar 8 attached to the support frame 2. The encased cable material 6 includes a membrane 12 portion and a cable portion 22. A set of undersurface heating units 10 or a single heating unit heats the lower surface 14 of the membrane 12 portion of the encased cable material 6 prior to application to the substrate 16.

An elongated roller presses the section of encased cable material 6 against the substrate 16 as it is reeled off of the roll 4. Prior to application of the encased cable material 6, a set of seam heating units 10 heat the upper surface of a previously laid section of roofing material along a line corresponding to the path of the encased cable material 6. The encased cable material 6 is applied in an overlapping relationship to the substrate 16 in order to form an overlapping seam 18 in the region previously heated by seam heating unit.

A pair of seam rollers 20 contact and compress the seam 18 so that an appropriate seal is formed at seam 18 at the same time that encased cable material 6 is being applied to the substrate 16. The encased cable 22 provides a seam 18 of cable 22 that retains the substrate 16 on the roofing deck in lieu of or in combination with other mechanical or adhesive attachment means.

The encased cable material 6 comprises the cable 22 in combination with the membrane roofing material portion to in overlapping relation. Thereby, the membrane 12 roofing material overlaps the cable 22 when applied to the substrate 16 to encase the cable 22, thus forming the encased cable material 6. Alternatively, the membrane 12 roofing material may be pre-attached to the cable 22 prior to formation into a roll 4.

The membrane 12 roofing material will be made from synthetic rubber, thermoplastic material, or modified bitumen. Thermoplastic material will apparently be the most popular choose of roofing material for this type of application. The cable 22 may be literally steel cable or a substitute material such as nylon rope, woven combinations of material including synthetics or metals, or any such strong and suitable material for forming a reinforced restraint member. It is contemplated that the encased cable material 6 may be desirable as a flat material such that a flat fabric, woven material, or other high strength flat material may be combined with the encasing membrane 12 roof material. Said membrane 12 roofing material may be pre-manufacture with a reinforced seam 18 of said high strength material to integrate said material into the encased cable material 6.

The frame 2 of the apparatus provides a support for the various operative elements of the apparatus, and includes a forward extending beam 24 or pair of beams joined to the frame 2 to mount double-sided heating units 10 that heat the undersurface of the encased cable material 6 and the top surface of the substrate 16 roofing material. A handle 26 is secured to the frame 2, which permits an operator to draw the apparatus across the surface to be covered as encased cable material 6 plays out behind apparatus welded to the roofing substrate 16.

A pair of forward wheels 28 is mounted on an axle 30 extending between members of the frame 2. The forward wheels 28 are located toward the front of the frame 2 along with the handle 26. The forward wheels 28 may be arranged before or after the heating units 10. The forward wheels 28 are behind the heating elements as shown in FIG. 1. The forward wheels 28, as the apparatus is pulled along toward the handle 26, may include a unitary wheel unit or separate compression roller for applying pressure between the encased cable material 6 and the roofing substrate 16 after heating to create the welded bond.

A platform 32 is supported on the frame 2 to provide a support platform for a heater unit fuel supply 34 and other features as may be added to the apparatus. The frame 2 is constructed of a welded angle iron construction in order to provide a heavy duty cart construction that is able to support a substantial fuel supply 34, encased cable material 6 roll 4 and other apparatus elements.

Encased cable material roll 4 provides a supply of the material that is replaceable and mounted on a spindle 36. The apparatus may include a guide 38 for the material on the roll 4 via linear guide tracks that receive posts or guide wheels, or a laser system that uses marker on an opposing side of the roofing substrate 16. The encased cable material roll 4 is mounted to be drawn forward and release a material onto the underlying substrate 16. The heating units 10 are drawn forward and move beneath the encased cable material 6 and above the substrate 16, as the diameter of roll 4 is reduced. Thus, the spindle 36 may adjusted to lower the roll 4 of encased cable material 6 as the diameter of the roll 4 diminished by hinging the support bar 8 to the frame 2 or providing a adjustable support means. Thus, even though the diameter of roofing material roll 4 is constantly diminishing, the spindle 36 lowers the roll 4 in order to maintain contact with the substrate 16.

As shown in FIG. 1, the heating units 10 each provide heating nozzles 40 that are oriented generally horizontally and directed toward the undersurface of encased cable material 6 as the material is dispensed and the upper surface of the substrate 16. The heating units 10 are conventional flattened burning nozzles 40 that extend to the two opposite sides of the frame 2. The narrowed nozzles 40 of seam heating units 10 concentrate their heating output in a region along which the seam 18 of the encased cable material 6 will be applied.

The heating units 10 may be provided with conventional igniter systems (not shown) which ignite the discharged fuel to provide an open flame heating unit. Alternatively, a radiant heater unit (not shown) is mounted to heat the undersurface of encased cable material 6 as it is played off of roll 4.

An elongated roller may be mounted to the frame 2 and extend between sides of the frame 2. The roller is mounted by a pair of end brackets attached to the sides of the frame 2. Roller may be a weighted cylindrical shaft that extends substantially the entire width of encased cable material 6 as the material is applied to the substrate 16. The roller may also provide for the support of frame 2. The weight of frame 2 therefore combines with the weight of roller to compress the encased cable material 6 against the substrate 16 in order to affect a solid bond along the entire width of the cable material. This bonds the cable material to the substrate 16 to reinforce the restraint of the underlying substrate 16 by the cable. Further, the cable is secured by the bond of the encasing material and the substrate 16 within the layers of the encasing material and substrate 16, usually consisting of layers of thermoplastic membrane material encasing the cable.

Additional seam rollers 20 may be mounted by brackets so as to extend rearward of the heating units 10 as the apparatus is pulled along. The seam rollers 20 are spaced toward the sides of frame 2 so as to contact the region along each side of the cable that is encased by the substrate 16 and encasing membrane 12 material. These regions on either side of the cable have been heated by the heating units 10 after the heating units 10 have passed the substrate 16 and encased cable material 6. The seam rollers 20 press downwardly against the supporting surface of comprising the upper surface of the encased cable material 6 and the substrate 16 to contact and compress corresponding seam along the sides of the cable.

In use, an operator mounts a roll 4 of encased cable material 6 on the spindle 36 so as to be fed down beneath the roll 4 and extend backwardly above a heating unit and beneath an elongated roller. A first end of the encased cable material 6 may be adhered to the substrate 16 by a handheld burning unit, adhesive or mechanical means, such as a cable tie-down eyelet attached to a beam of the roof deck. Thereafter, the operator draws the apparatus across the area to be retained by the cable while operating the heating unit to heat the lower surface 14 of encased cable material 6 as it is dispensed from roll 4. While applying the encased cable material 6, the edges of the encased cable material 6 are heated such that the heat bondable material encasing the cable is prepared for bonding. Thereafter, the apparatus is manipulated to apply the encased cable material 6 so as to overlap with an adjacent substrate 16 roofing material section and thus provide the overlapping cable seam 18 necessary to apply a retaining cable to the roofing substrate 16 material in lieu of other attaching means. The heating units 10 heat the upper surface of adjacent substrate 16 roofing material section prior to the encased cable material 6 being applied. Roller presses encased cable material 6 against the substrate 16, while optional additional rollers compress the edges of the encasing material on either side of the cable to the substrate 16 to enhance the bond and seal of the encased cable material 6 to the substrate 16.

The frame 2 may be generally rectangular and include a handle 26 by which the apparatus is drawn over the surface to be retained by the cable. The mount for encased cable material roll 4 may include a flexible boom 44 that attaches to a bracket 46 on the frame 2 so as to extend forward of the frame 2 and permit contact of the roll 4 with the substrate 16 surface. The mount for the encased cable material roll 4 may also be situated between the two sides of the frame 2, and the heating element moved rearward within the frame 2 for a more compact apparatus.

It will be understood that the above is merely a description of the preferred embodiments and that one skilled in the art will recognize that various modifications or improvements may be made without departing from the spirit of the invention disclosed herein. The scope of protection afforded is to be determined by the claims which follow and the breadth of interpretation that the law allows.

I claim:

1. An apparatus for creating an encased cable seam comprising:
   a transportable frame;
   a roll of encased cable material comprising a cable in combination with a membrane material in overlapping relation with a region of the membrane material along opposing sides of the cable carried on a spindle that is supported by a support bar;
   said support bar attached to boom that is attached to the transportable frame;
   at least one heating unit supported by the frame and arranged to heat the bottom surface of a membrane portion of the encased cable material as the encased cable material is released from the roll toward a roof deck;
   a handle attached to the frame for moving the apparatus forward;
   seam rollers mounted rearward of the heating unit and spaced towards the sides of the transportable frame so as to contact the region of the membrane material along the opposing sides of the cable; and
   a roller attached to the frame for pressing the encased cable material and causing a welded bond as the handle moves the apparatus forward.

* * * * *